Feb. 20, 1962 R. A. DENTON ETAL 3,021,712
PRESSURE GAUGE
Filed Feb. 25, 1958 2 Sheets-Sheet 1
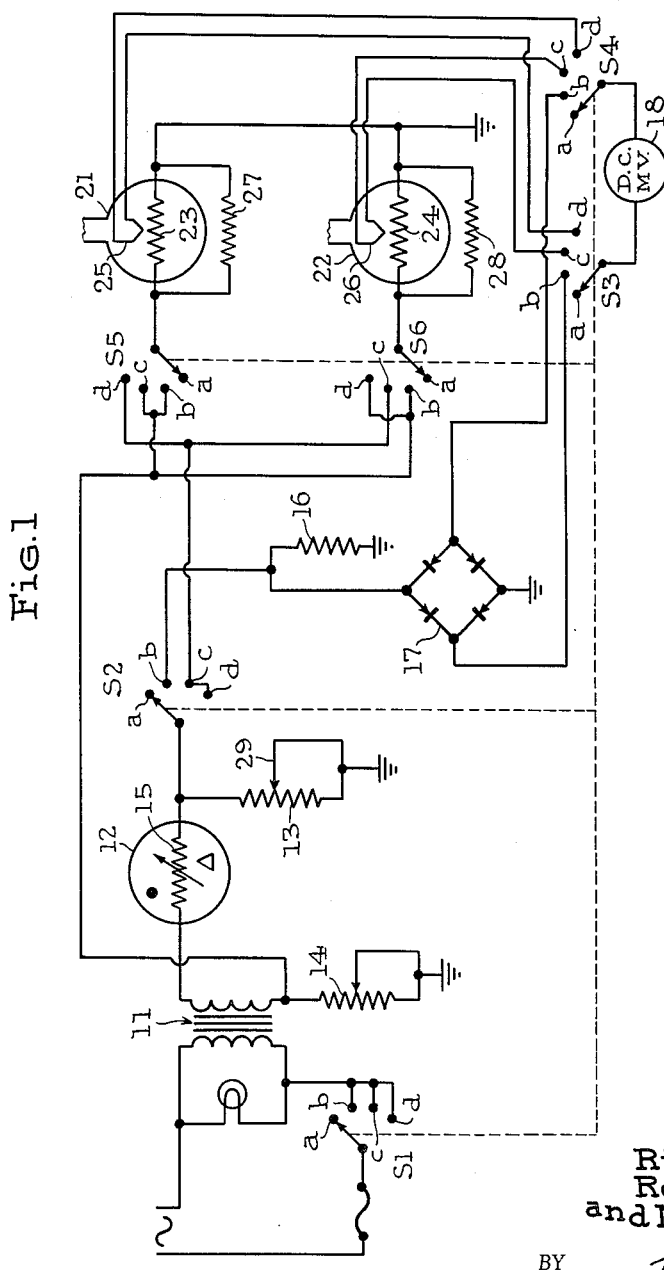
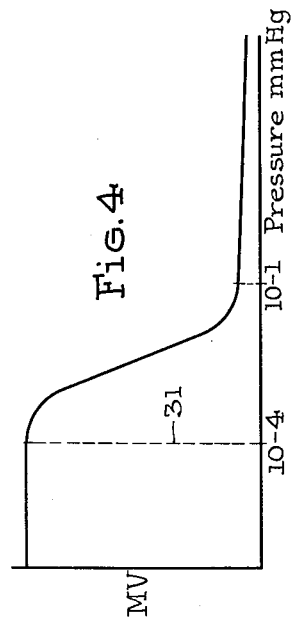
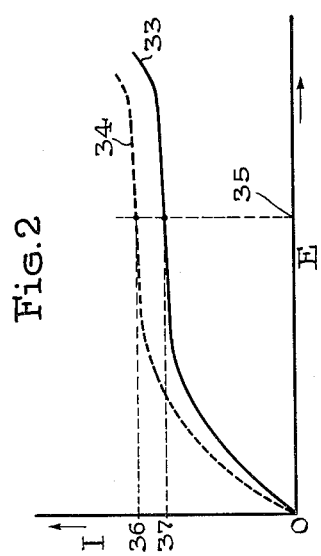
INVENTORS
Richard A. Denton
René P. Le Riche
and Michael P. Rivera
BY
Dodge and Sons
ATTORNEYS

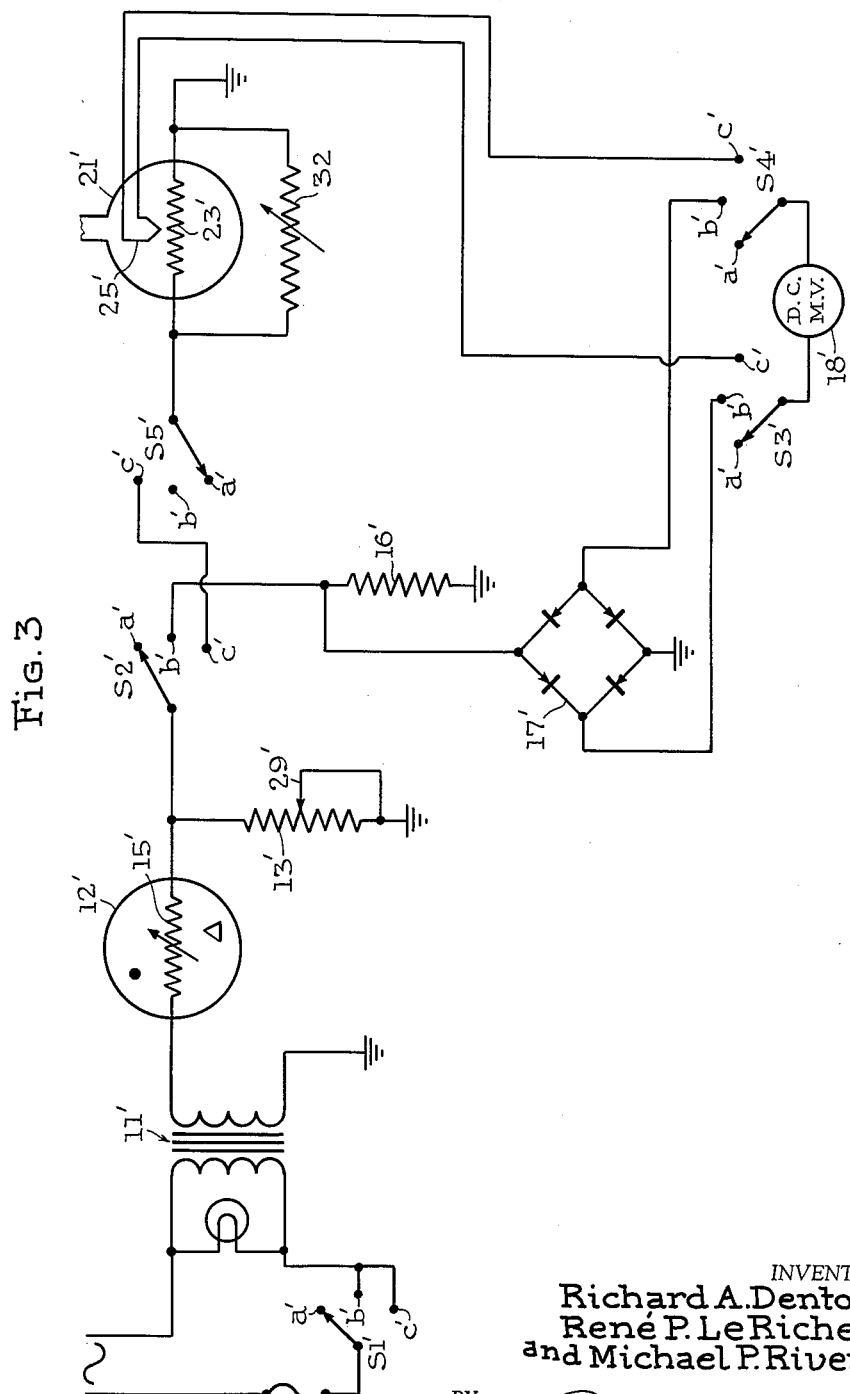

3,021,712
PRESSURE GAUGE

Richard A. Denton, Rene P. Le Riche, and Michael P. Rivera, Haddonfield, N.J., assignors to The New York Air Brake Company, a corporation of New Jersey
Filed Feb. 25, 1958, Ser. No. 717,355
7 Claims. (Cl. 73—399)

This invention relates to pressure gauges and more particularly to gauges of the hot wire type in which the temperature of the hot wire is indicative of the pressure of the gas surrounding the wire.

Gauges of this type are in common use today in high vacuum systems. In general, they comprise a gauge tube, an electric current supply circuit, and a temperature measuring circuit. The gauge tube consists of a sealed envelope communicating with the vacuum system, a heater filament, and a thermocouple for measuring the temperature of the filament. The measuring circuit includes a voltmeter connected across the output of the thermocouple. Current passing through the filament produces heat, and, within a pressure range of about 0.001 to 1.0 mm. of mercury, the rate of heat transfer from the filament to the gas is proportional to the pressure. As a result, the temperature of the filament, and therefore the output of the thermocouple, is a measure of the pressure of the gas.

In practice, it has been found that the characteristics of the heater filaments, i.e., resistance, diameter, length, etc., vary from tube to tube. Since the output of the thermocouple is a function of these characteristics, it is necessary to recalibrate the measuring circuit each time the gauge tube is replaced. In order to recalibrate the measuring circuit, the pressure in the gauge tube must be reduced below 0.001 mm. of mercury (the lower limit of the operating range of the gauge tube) so that a reference point can be established on the indicating scale of the voltmeter. Even if the users of these gauges possess the equipment necessary to establish a pressure as low as this, and many do not, still the recalibration of the circuit is a burden because of the time it requires. The burden is increased in those cases where a plurality of concurrent pressure measurements are desired because each tube requires either a different input current or a separate measuring circuit.

The object of this invention is to provide a method of compensating the gauge tubes for variations in the characteristics of the heater filaments, and further to provide an improved measuring system in which the compensated gauge tubes can be interchanged at will without the necessity for recalibrating the measuring circuit. According to the preferred form of the invention, a variable resistor is connected in parallel with the heater filament of a gauge tube and a constant standard current is supplied to the junction of the parallel-connected filament and resistor. The pressure in the gauge tube is then reduced below 0.001 mm. of mercury and the resistance afforded by the resistor is varied until the output of the thermocouple produces full-scale deflection of the voltmeter. When this condition is attained, the resistance of the resistor is measured and a compensating resistor having that value is permanently connected in parallel with the filament of that tube. All tubes are compensated in the same manner using the same standard current with the result that whenever in use, equal currents are applied to these compensated tubes, all of the thermocouples will have the same output regardless of the fact that the characteristics of the heater filaments are different.

The preferred measuring system provided by the invention has a power supply circuit which delivers to the junction of the parallel-connected heater filament and compensating resistor of each tube a constant operating current equal to the standard current used in the process of determining the resistance of the compensating resistors. Because of this, the measuring system can be operated without calibrating the thermocouple read-out meter.

Another feature of the invention relates to the use of a material in the compensating resistors which has a positive temperature coefficient of resistance related to that of the windings of the thermocouple read-out meter. This feature affords temperature compensation for the meter.

A further feature of the invention relates to a system in which a plurality of gauge tubes are to be operated in sequence and involves the provision of means for prewarming each tube before it is connected into the measuring circuit.

A preferred embodiment of the invention will now be described in detail having reference to the accompanying drawing, in which:

FIG. 1 is a wiring diagram of a pressure measuring circuit employing two gauge tubes.

FIG. 2 is a graph showing the relationship between the current flowing through and the voltage drop across the barreter.

FIG. 3 is a wiring diagram of a circuit used in the process of determining the resistances of the compensating resistors.

FIG. 4 is a graph showing the relationship between the output of the thermocouple and the pressure in the gauge tube.

Referring to FIG. 1, the circuit comprises three basic sections, namely, a power supply section, a calibrating section, and a measuring and indicating section. The power supply section comprises an input transformer 11, a current regulating device 12, a variable calibrating resistor 13, and a variable stand-by heater resistor 14. The primary of transformer 11 is connected with a source of A.C. voltage through contacts $b$, $c$ and $d$ and the wiper of switch S1. The current regulating device 12 is a barreter or ballast tube which, within a specified range of voltages across the device, establishes a substantially constant current. Characteristic current-voltage drop curves for such devices are shown in FIG. 2.

The calibrating section of the circuit comprises a switch S2, a precision standardizing resistor 16, a rectifier bridge 17 connected across standardizing resistor 16, and a D.C. millivoltmeter 18 connected through contacts $b$ of switches S3 and S4 with the output of rectifier bridge 17.

The measuring and indicating section of the circuit comprises switches S5 and S6, and gauge tubes 21, 22. The gauge tubes contain heater filaments 23 and 24 which are connected with the wipers of switches S5 and S6, respectively, and thermocouples 25 and 26 which are connected through contacts $d$ and $c$, respectively, of switches S4 and S3 with the D.C. millivoltmeter 18. Compensating resistors 27 and 28 are connected in parallel with heater filaments 23 and 24, respectively. These compensating resistors are so selected that the output voltage versus pressure curves of the two thermocouples will be identical.

The circuit shown in FIG. 1 could be used in the process of compensating the gauge tubes, but in the interests of clarity, this process will be described with reference to the simplified version of this circuit shown in FIG. 3. The components of the FIG. 3 circuit bear the same numerals, with prime designations, as their FIG. 1 counterparts.

The first step in the compensating process is the adjustment of calibrating resistor 13'. This step is carried out with the wipers of switches S1' through S5' on their $b'$ contacts so that standardizing resistor 16' is connected in parallel with calibrating resistor 13'. The voltage drop across standardizing resistor 16' is applied to the input terminals of rectifier bridge 17' and the D.C. output of this bridge is read on D.C. millivoltmeter 18'. Adjustable tap 29' of calibrating resistor 13' is shifted until the voltage drop across standardizing resistor 16' attains a predetermined standard value.

The switches S1' through S5' are then shifted to their c' contacts, thereby disconnecting standardizing resistor 16' from the power supply section and substituting therefor the filament 23' of the uncompensated gauge tube 21'. At the same time, the output leads of thermocouple 25' are connected through contacts c' of switches S3' and S4' to the millivoltmeter 18'. The pressure in the gauge tube is now reduced below the operating range of the instrument, i.e., below $10^{-4}$ millimeters of mercury (see line 31 in FIG. 4). Variable resistor 32, connected in parallel with the gauge tube filament 23', is now adjusted until the pointer of millivoltmeter 18' registers full-scale deflection. The resistance afforded by variable resistor 32 is then measured and a compensating resistor having this resistance is permanently placed in parallel with gauge tube filament 23'.

Gauge tubes compensated in the manner just described are employed in the operation of the measuring system shown in FIG. 1. Throughout the following discussion of operation, it is important to note that standardizing resistors 16 and 16' afford equal resistances and that meters 18 and 18' have identical operating characteristics. When the wipers of switches S1 through S6 are moved to their b contacts, standardizing resistor 16 will be placed in parallel with calibrating resistor 13 and the output of rectifier bridge 17 will be applied to the meter 18. The adjustable tap 29 of calibrating resistor 13 is shifted until the voltage drop across standardizing resistor 16 has the same predetermined standard value as that mentioned in connection with the operation of FIG. 3. Since the resistances of standardizing resistors 16 and 16' are equal, the current flowing through standardizing resistor 16 will be the same as the current which passed through standardizing resistor 16' when calibrating resistor 13' was adjusted. The reason for providing the calibrating section in the FIG. 1 system is to compensate for variations in the operating characteristics of the barreters. Referring to FIG. 2, curves 33 and 34 represent the operating characteristics of barreters 12' and 12, respectively. If the predetermined standard voltage drop across standardizing resistors 16 and 16', when subtracted from the output voltage of transformer 11, leaves a voltage drop 35 across the barreters 12 and 12', it will be apparent that the current 36 established by barreter 12 will be higher than the current 37 established by the barreter 12'. This change in current will be compensated by the difference in the resistances afforded by calibrating resistors 13 and 13'.

After tap 29 has been adjusted, the wipers of switches S1 through S6 are moved to their c contacts so that the pressure in gauge tube 22 can be measured. In this position of the switches, standardizing resistor 16 is disconnected from the power supply section and the parallel-connected heater filament 24 and compensating resistor 28 are connected in parallel with calibrating resistor 13. Since the difference in the currents established by the barreters 12 and 12' is compensated by calibrating resistor 13, the output voltage range of thermocouple 26 will be the same as the output range of thermocouple 25' in FIG. 3. Therefore, the output of thermocouple 26 can be read on meter 18 without calibrating the measuring circuit.

When the switches S1 through S6 are shifted to their d contacts, gauge tube 22 is replaced by gauge tube 21 and the pressure in this tube is now read on millivoltmeter 18.

While, in the preferred embodiment, standardizing resistors 16 and 16' afford equal resistances, it will be apparent that this arrangement is not an essential feature of the invention. The FIG. 1 system was designed this way merely to eliminate the need for calibrating millivoltmeter 18.

It should be observed that when the wipers of switches S1 through S6 are on their b contacts and calibrating resistor 13 is being adjusted, the voltage drop across standby resistor 14 is applied to both gauge tubes. When these wipers are on their c and d contacts and the pressure in one or the other of the gauge tubes is being measured, this same voltage is applied across that tube which is then in the stand-by condition (i.e., the tube which is not then connected in parallel with calibrating resistor 13). The purpose of this arrangement is to prewarm the filaments of the gauge tubes and thereby reduce the time required for them to reach operating temperature when they are subsequently connected into the measuring circuit.

It should also be noted that the windings of the millivoltmeter 18 have a positive temperature coefficient of resistance, i.e., resistance increases as temperature increases. Thus if ambient temperature should rise, the pressure indicated by the meter would be higher than that which actually existed in the gauge tube. To compensate for this condition, the compensating resistors 27 and 28 are made from a material having a positive temperature coefficient of resistance related to the temperature coefficient of resistance of the meter windings. The effect of this is to cause a progressively greater portion of the current delivered to the junction of the parallel-connected heater filament and compensating resistor to pass through the heater filament as the ambient temperature rises. This increases the temperature of the heater filament and therefore the increase in meter resistance is just balanced by the attendant increase in thermocouple output.

As stated previously, the drawings and description relate only to a preferred embodiment of the invention. Since many changes can be made in this embodiment without departing from the inventive concept, the following claims should provide the sole measure of the scope of the invention.

What is claimed is:

1. In a vacuum gauge of the type including a sealed envelope having an inlet connection, an electrical heater element, within the envelope, and a thermocouple for measuring the temperature of the heater element, the improvement which comprises a resistance connected in parallel with the heater element and having a magnitude such that the thermocouple has a preselected output range.

2. The method of compensating a vacuum gauge of the type in which the temperature of an electrical heater element is measured by a thermocouple and the output of the thermocouple is indicative of the pressure of the surrounding gas, comprising the steps of adjusting the pressure of the surrounding gas to a predetermined value; placing a resistance in parallel with the heater element; applying a constant electrical current to the junction of the parallel connected heater element and resistance; and varying the magnitude of the resistance until the output of the thermocouple attains a predetermined value.

3. In combination, a vacuum gauge tube comprising a sealed envelope having an inlet connection, an electrical heater element within the envelope, and a thermocouple for measuring the temperature of the heater element; an electrical circuit including in series a source of electrical energy providing a constant current and the electrical heater element; and a compensating resistance connected in parallel with the heater element, the resistance afforded by the compensating resistance being such that the thermocouple has a preselected output range.

4. The combination defined in claim 3 including a millivoltmeter connected with the thermocouple, the windings of the meter having a positive temperature coefficient of resistance; and in which the compensating resistance is made from a material having a positive temperature coefficient of resistance related to the temperature coefficient of resistance of the meter windings.

5. In combination, an electrical circuit including in series a source of electrical energy, a current regulator for establishing a constant current, and a calibrating resistance; means for varying the resistance afforded by the calibrating resistance; a vacuum gauge tube comprising a sealed envelope having an inlet connection, an electrical heater element within the envelope, and a thermocouple for measuring the temperature of the heater element; a compensating resistor connected in parallel with the heater element, the resistance afforded by the resistor being so selected that the thermocouple will have a preselected output range; a standardizing resistance; means for measuring the voltage drop across the standardizing resistance; and switching means for selectively connecting in parallel with the calibrating resistance either the parallel-connected heater element and compensating resistor or the standardizing resistance.

6. In combination, a source of electrical energy providing a constant current; a plurality of vacuum gauge tubes, each comprising a sealed envelope having an inlet connection, an electrical heater element within the envelope, and a thermocouple for measuring the temperature of the heater element; compensating resistors, one connected in parallel with each heater element, the resistances afforded by the resistors being such that the thermocouples have identical output ranges; common means for indicating the output of the thermocouples; and switching means for selectively connecting each of the parallel-connected heater elements and compensating resistors with the source of electrical energy, and for simultaneously connecting the associated thermocouple with the common indicating means.

7. The combination defined in claim 6 including means for applying a prewarming voltage to each heater element before it is connected with the source of electrical energy.

References Cited in the file of this patent

UNITED STATES PATENTS

| | | |
|---|---|---|
| 1,381,450 | Butterfield | June 14, 1921 |
| 1,887,599 | Nyquist | Nov. 15, 1932 |
| 2,633,737 | Richardson | Apr. 7, 1953 |
| 2,734,376 | Cherry et al. | Feb. 14, 1956 |

OTHER REFERENCES

Ballerini: "The Thermocouple Gauge," Galileo News, Sept. 4, 1950, pp. 24 to 27. (Copy in Div. 36, 73–399.)

Taylor: "New Combustible Gas Analyzer," Instrumentation, vol. 5, Issue 6, pages 35–36 First quarter, 1952. (Photostat available, Div. 36, 73–26.)